United States Patent Office 3,254,107
Patented May 31, 1966

3,254,107
METHOD FOR THE PRODUCTION OF HALOGENATED ALKYL CHLOROSULFATES AND FLUOROSULFATES
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Sept. 20, 1963, Ser. No. 310,500
9 Claims. (Cl. 260—456)

This application is a continuation-in-part of copending application Serial No. 735,702, now abandoned, filed May 16, 1958, for Halogenated Organic Compounds, by Murray Hauptschein and Milton Braid.

This invention is concerned with a new method for producing halogenated chlorosulfates and fluorosulfates by the reaction of chlorosulfonic acid or fluosulfonic acid with certain halogenated iodides.

The use of the versatile reagent chlorosulfonic acid in sulfonation, sulfation, chlorosulfonation, and chlorosulfation reactions is well known in hydrocarbon chemistry. Chlorosulfonic acid may react, for example, with hydrocarbon alcohols and olefins to produce the corresponding chlorosulfates. Aromatic hydrocarbons, such as benzene and naphthalene, or aliphatic hydrocarbons, such as decane may be chlorosulfonated by reaction with chlorosulfonic acid. In most cases the corresponding sulfates and sulfonic acids can be formed by substituting concentrated sulfuric acid or fuming sulfuric acid for chlorosulfonic.

In the case of many halogenated compounds, such as perfluoroaliphatic or perfluoroaromatic compounds, these types of reactions (i.e. sulfation, sulfonation, chlorosulfation or chlorosulfonation) are not applicable. In some cases the halogenated analogs of the starting materials are unknown. For example, the 1,1-dichloro-1-hydroxy, or 1,1-difluoro-1-hydroxy alcohols are not known and thus the corresponding sulfate cannot be prepared through the usual route of sulfating the hydroxyl group. Likewise, in the case of the perfluoroaromatics there are no hydrogens available for reaction, and thus these cannot be sulfonated. Likewise, many halogenated halosulfates, particularly perhalogenated halosulfates cannot be prepared by chlorosulfation or fluorosulfation of the corresponding olefin with chlorosulfonic acid or fluorosulfonic acid.

In accordance with this invention a new method has now been found for preparing halogenated alkyl chlorosulfates and fluorosulfates, many of which are novel compounds and not susceptible of preparation by prior methods. This new reaction, producing the desired halogenated halosulfates in good yields and conversions, involves the reaction of chlorosulfonic acid or fluosulfonic acid with halogenated alkyl iodides of the formulae:

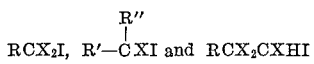

where R represents chlorine or fluorine or haloalkyl radicals which are at least one-half halogenated (i.e., at least one-half of the hydrogen of the corresponding alkyl radical are substituted by halogen); where R' and R" represent haloalkyl radicals which are at least half halogenated; and where X represents chlorine or fluorine or both. In this reaction, the chlorosulfate ($OSO_2Cl$) or fluorosulfate ($OSO_2F$) group replaces the iodine to form the corresponding halosulfate with the halosulfate group ($OSO_2X$) bonded to the carbon vacated by the iodine through an oxygen atom thus:

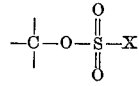

The reaction of the invention may be illustrated in the case of 1-iodoperfluoropropane and chlorosulfonic acid by the following equation:

(1) 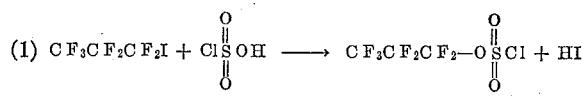

Iodine chlorides and sulfur dioxide are in general the inorganic products ultimately formed, probably as the result of the following reactions:

(2) 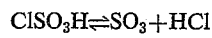

(3) 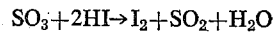

(4) 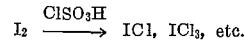

As will be shown in detail in the description which follows, the reaction of fluosulfonic or chlorosulfonic acid with these halogenated iodides produces the fluorosulfate or chlorosulfate, that is, compounds in which the sulfur of the fluosulfonic or chlorosulfonic acid is linked to a carbon atom through an oxygen atom

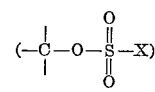

to the substantial exclusion of sulfonyl chlorides or fluorides

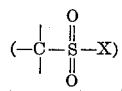

or sulfonic acids

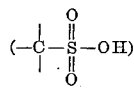

in which the sulfur of the chlorosulfonic group is linked directly to a carbon atom, and to the substantial exclusion also of sulfites $$(-\overset{|}{C}-O-\overset{O}{\underset{|}{S}}-X)$$

The reaction of chlorosulfonic and fluosulfonic acid with haloalkyl iodides to form stable halosulfates is surprising in view of the behavior of these same iodides toward sulfuric acid, a strong closely analogous acid. When reacted with fuming sulfuric acid, iodides such as $CF_3CF_2CF_2I$ (which upon reaction with chlorosulfonic or fluosulfonic acid give high yields of stable chlorosulfates and fluorosulfates such as $CF_3CF_2CF_2OSO_2Cl$ and $CF_3CF_2CF_2OSO_2F$ respectively), give instead almost exclusively carboxylic acid fluorides and acids such as $CF_3CF_2COF$ and $CF_3CF_2COOH$. Likewise, the production of halosulfates to the exclusion of sulfonic acids or sulfonyl halides (in which the sulfur is bonded directly to a carbon atom) was not to be expected since in reactions with hydrocarbon analogues the sulfonic acid or sulfonyl halide is the principal of exclusive product.

The stable halosulfates provided by the method of the present invention are a valuable class of compounds. Many of these are novel and are claimed in our copending applications Serial No. 310,441 for Halogenated Organic Compounds; Serial No. 310,442 for Halogenated Organic Compounds; Serial No. 310,479 for Halogenated Organic Compounds and Serial No. 310,499 for Halogenated Organic Compounds all filed concurrently with this application. As set forth in more detail in said applications the halosulfates produced by the method of the present invention provide valuable intermediate for conversion into halogenated carboxylic acids, esters, thiolesters, amides, ketones and aldehydes through a series of unique one step reactions.

The method of the invention is particularly applicable to iodides of the type $RCX_2I$. In general these react in highest yields to give desired halosulfates of the formula $RCX_2OSO_2X$ with a minimum of by-products.

A preferred group of starting iodides for the reaction of the invention include those in which R, R' and R'' in the formulae above are haloalkyl radicals in which the halogens are selected from the class consisting of fluorine and chlorine, i.e., where the halogens may be fluorine, chlorine or both.

Of particular value are starting iodides in which R, R' and R'' are haloalkyl radicals selected from the class consisting of perfluoroalkyl, perfluorochloroalkyl, perfluorohydroalkyl, and perfluorochlorohydroalkyl radicals. As used herein, the term perfluoroalkyl means an alkyl radical containing only the elements carbon and fluorine; a perfluorochloroalkyl radical means one which contains only the elements chlorine, fluorine and carbon in which the ratio of fluorine to chlorine atoms is at least 1:1; a perfluorohydroalkyl radical means one which contains only the elements fluorine, hydrogen and carbon in which the ratio of fluorine to hydrogen atoms is at least 1:1, and a perfluorochlorohydroalkyl radical means one which contains only the elements fluorine, chlorine, hydrogen and carbon and in which the ratio of chlorine+fluorine atoms to hydrogen atoms is at least 1:1.

Perfluorinated alkyl iodides of the type $RCF_2I$ where R is a perfluoroalkyl group represent an especially valuable class of starting iodides which react readily and in high yields to provide perfluorinated halosulfates of the formula $RCF_2OSO_2X$ having many valuable uses.

While the starting iodides may be prepared by any desired procedure, a group of iodides of particular interest are those prepared by so-called telomerization techniques by the reaction of a haloalkyl iodide with a fluorinated olefin. Of particular interest as starting materials in the invention are telomer iodides derived by the reaction of a haloalkyl iodide with vinylidene fluoride, tetrafluoroethylene, chlorotrifluoroethylene, or 1,1-difluoro-2-chloroethylene. Telomer iodides of these types may be represented by the formulae:

$$R'''[CH_2CF_2]_nI$$
$$R'''[CF_2CF_2]_nI$$
$$R'''[CF_2CFCl]_nI$$
$$R'''[CF_2CHCl]_nI$$

where R''' is a haloalkyl radical which is at least half halogenated and in which the halogens are preferably selected from the class consisting of chlorine and fluorine and where n is an integer from 1 to about 30. Any of the known telomerization procedures may be used for the preparation of these or similar telomer iodides. For example, telomer iodides or co-telomer iodides of vinylidene fluoride with other fluorinated olefins may be prepared according to the procedures described in United States Patents Nos. 2,975,220 and 3,091,648 of Murray Hauptschein et al. Telomers of tetrafluoroethylene or chlorotrifluoroethylene may be prepared for example, by the procedure described by Haszeldine, Journal of the Chemical Society 3761 (1953). Telomers or co-telomers of $CF_2$=CHCl may be prepared for example, according to the procedure described in United States Patent No. 3,051,764 of Murray Hauptschein et al.

In cases where a polyhalosulfate is desired, the radical R, R' or R'' in the formulae $RCX_2I$, $$\begin{array}{c} R'' \\ | \\ R'CXI \end{array}$$

and $RCX_2CXHI$ may contain one or more iodine atoms. Where such iodine atom or atoms are present in a group of the following type: $-CX_2I$;

$$\begin{array}{c} R'' \\ | \\ -CXI \end{array}$$

or $-CX_2CXHI$, where R'' and X are as defined above, such iodine or atoms will likewise undergo reaction with chlorosulfonic or fluosulfonic acid to produce one or more additional halosulfate groups in the reaction product. Thus, for example, the diiodide $ICF_2CF_2CF_2CF_2CF_2CF_2I$ reacts with chlorosulfonic acid to give the dihalosulfate $$ClSO_2O-CF_2CF_2CF_2CF_2CF_2CF_2-OSO_2Cl$$

Similarly, the diiodide $ICF[CH_2CF_2]_4I$ will react with chlorosulfonic acid to give the dichlorosulfate $$ClSO_2O-CF_2[CH_2CF_2]_4-OSO_2Cl$$

Perfluorinated diiodides of the type $I[CF_2]_nI$ may be prepared by telomerization procedures, for example by reacting a diiodide such as $ICF_2CF_2I$ with $CF_2$=$CF_2$ to produce telomers of the series e.g. $ICF_2CF_2[CF_2CF_2]_nI$ where n is an integer preferably from 1 to about 20. Similarly, diiodides containing repeating vinylidene fluoride ($CH_2$=$CF_2$) units may be prepared, for example by reacting a diiodide such as $ICF_2CF_2I$ with vinylidene fluoride to produce telomers of the series, e.g., $$ICF_2CF_2[CH_2CF_2]_nI$$

where n is an integer preferably from one to about 20.

The number of carbon atoms contained in the starting iodides is not critical and may vary for example between 1 and 100 or more, although in more usual applications, the number of carbon atoms in the starting iodide will range between about 1 and 50.

Specific examples of suitable starting iodides are:

$CF_3I$
$CF_2ClI$
$CFCl_2I$
$CF_3CF_2I$
$CF_2ClCF_2I$
$CFCl_2CF_2I$
$CF_2ClCFClI$
$CF_2ClCCl_2I$
$CHF_2CF_2I$
$CHF_2CFClI$
$CF_2BrCF_2CF_2CF_2I$
$CF_2BrCFClCF_2CF_2I$
$CF_3CH_2CF_2I$
$C_3F_7CH_2CF_2I$
$CFCl_2CF_2CH_2CF_2I$
$CF_3CF_2CF_2I$
$CF_3CF_2CFClI$
$CF_3CF_2CCl_2I$
$CF_2ClCF_2CCl_2I$
$CHF_2CF_2CFClI$
$CF_2ClCF_2CF_2I$
$CFCl_2CF_2CF_2I$
$CH_2ClCF_2CF_2I$
$CH_3CF_2CF_2I$
$CF_3CFClI$
$CF_3CCl_2I$
$CF_2ClCH_2CF_2I$
$CF_2ClCFClCH_2CF_2I$
$C_7F_{15}CH_2CF_2I$

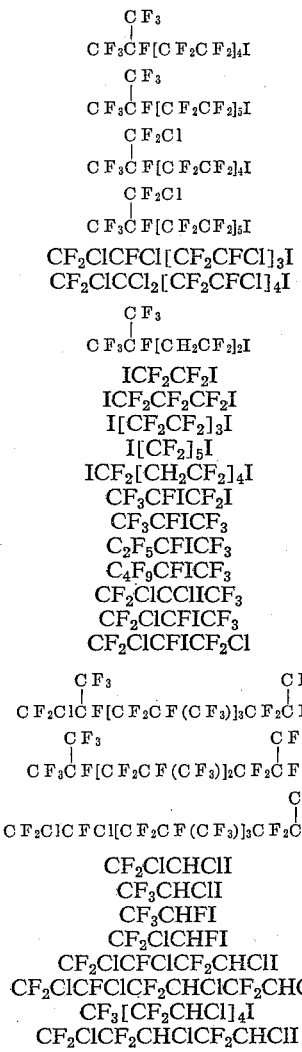

CF₂ClCFCl[CF₂CFCl]₃I
CF₂ClCCl₂[CF₂CFCl]₄I $$\text{CF}_3\overset{\overset{\text{CF}_3}{|}}{\text{C}}\text{F[CH}_2\text{CF}_2]_2\text{I}$$

ICF₂CF₂I
ICF₂CF₂CF₂I
I[CF₂CF₂]₃I
I[CF₂]₅I
ICF₂[CH₂CF₂]₄I
CF₃CFICF₂I
CF₃CFICF₃
C₂F₅CFICF₃
C₄F₉CFICF₃
CF₂ClCCIICF₃
CF₂ClCFICF₃
CF₂ClCFICF₂Cl $$\text{CF}_2\text{Cl}\overset{\overset{\text{CF}_3}{|}}{\text{C}}\text{F[CF}_2\text{CF(CF}_3\text{)]}_3\text{CF}_2\overset{\overset{\text{CF}_3}{|}}{\text{C}}\text{FI}$$

$$\text{CF}_3\overset{\overset{\text{CF}_3}{|}}{\text{C}}\text{F[CF}_2\text{CF(CF}_3\text{)]}_2\text{CF}_2\overset{\overset{\text{CF}_3}{|}}{\text{C}}\text{FI}$$

$$\text{CF}_2\text{ClCFCl[CF}_2\text{CF(CF}_3\text{)]}_3\text{CF}_2\overset{\overset{\text{CF}_3}{|}}{\text{C}}\text{FI}$$

CF₂ClCHClI
CF₃CHClI
CF₃CHFI
CF₂ClCHFI
CF₂ClCFClCF₂CHClI
CF₂ClCFClCF₂CHClCF₂CHClI
CF₃[CF₂CHCl]₄I
CF₂ClCF₂CHClCF₂CHClI

Generally speaking, the defined class of halogenated iodides react with chlorosulfonic or fluosulfonic acid at temperatures ranging from −20° C. to +300° C. The preferred temperatures are generally in the range of from −5° C. to +250° C. The optimum temperatures within the range will vary somewhat depending upon the particular iodide employed and upon whether chlorosulfonic or fluorosulfonic acid is used.

It has been found, for example, that primary iodides of the type RCX₂I, wherein the carbon adjacent to that containing the iodine is attached to two hydrogens, such as in the iodide CF₃CH₂CF₂I, the reaction with chlorosulfonic and fluosulfonic acid proceeds very rapidly with excellent yields at low temperatures ranging from about −20° C. to +50° C. and preferably from −10° C. to +30° C. With iodides of this type it is preferable to avoid higher temperatures because of the possibility of side reactions occurring, lowering the yield of the desired product. The reason for the higher reactivity of iodides of this type is not understood.

The reaction of chlorosulfonic or fluorosulfonic acid with iodides, other than those terminating in a —CH₂CX₂I group, requires temperatures ranging generally from about +20° C. to +300° C. and preferably in the range from about +40° C. to +250° C. to achieve satisfactory rates of reaction.

Generally, the rate of reaction increases with increasing temperature. Higher temperatures, however, particularly in the case of the secondary iodides of the

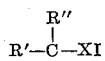

series, tend to decrease the yield of halosulfate due to a competing reaction involving the conversion of the iodide to the chloride or fluoride by replacement of iodine with the chlorine or fluorine of the chlorosulfonic or fluosulfonic acid. Thus, the optimum temperature of reaction will often be determined by the optimum balance between temperatures that give reasonable reaction rates and conversions, and those which give the best yield of the desired halosulfate.

The reaction of the iodide with chlorosulfonic acid proceeds in many cases more readily at a given temperature than with fluosulfonic acid. Thus, the optimum temperature to form the fluorosulfate may range from 10° C. to 100° C. higher than that found optimum for the chlorosulfate.

The reaction pressure is not critical. Thus, the reaction may be carried out at atmospheric pressure or even under slight vacuum, or if desired under any practical pressures ranging for example, up to 50,000 pounds per square inch. Where the reactants are not volatile compounds the reaction is most conveniently carried out under atmospheric pressure. Where the reactants are low boiling, such for example as in the case CF₃I, it is desirable to carry out the reaction in an autoclave, or other suitable pressure equipment, so as to maintain the reactants in the liquid phase at the particular reaction temperature involved.

The reaction time is likewise not critical. The longer the reaction period, of course, in general the higher will be the conversion. Thus, depending on the particular reactant iodide, the reaction period may range from 1 minute to several days. Where the iodides are reactive, such as those terminating in a —CH₂CX₂I group, they may react almost instantaneously at low temperatures, and excellent yields may be obtained in the matter of a few minutes of reaction time. Other less reactive iodides may require several hours to one or two days in some cases to obtain good yields. In general, the reaction rate increases with the temperature and thus, using temperatures in the higher portions of the ranges defined above, shorter reaction periods may be employed.

The molar ratio of the chlorosulfonic or fluosulfonic acid to the iodide is not critical but should generally be in the range of from 1:1 to 20:1 and preferably in the range of about 2:1 to 10:1. An excess of the chlorosulfonic acid is preferable to insure complete reaction of the iodide.

In most cases the halosulfonic acid and the starting iodide can be mixed together and then heated to the reaction temperature. In the case of reactive iodides it is preferred to add the iodide slowly to an excess of the halosulfonic acid maintained at the desired reaction temperature.

The reaction may be conducted with or without a solvent. In general no solvent is required, although if desired halogenated solvents may be present.

Since some of the reactants, particularly the halosulfonic acids, and some of the reaction products, are corrosive, it is often preferable to conduct the reaction in glass or glass lined equipment or in metal equipment which is resistant to the corrosive influence of the reagents employed.

Since it is usually preferable to employ an excess of the halosulfonic acid, the reaction product will generally contain unreacted chlorosulfonic or fluosulfonic acid. The halosulfate may be separated from the halosulfonic acid by pouring the reaction mixture over crushed ice or into water held at 0° C. The halosulfonic acids being soluble in water will dissolve in the water and the halosulfates, being generally water insoluble, will separate as the lower organic layer. Use of low temperatures to effect this separation is important both from the standpoint of avoiding excessive heating when the halosulfonic acid dissolves in water, and to avoid hydrolysis of the halosulfate. In some cases, if the halosulfate boils at a sufficiently different temperature from the corresponding halosulfonic acid, it can be removed from the mixture without water washing by a simple distillation, although this procedure is not usually preferred. Iodine which is also usually formed in the reaction can be removed from the halosulfate by filtration, by selective solvent extraction, or other well known techniques.

In many cases, particularly with many perfluorinated or perfluorochlorinated halosulfates, the separation of the crude halosulfate from the excess halosulfonic acid may be accomplished simply by permitting the reaction mixture to stand whereupon it separates into two phases, an organic phase containing the crude halosulfate and an inorganic phase containing mostly unreacted halosulfonic acid, after which the halosulfate may be recovered by simple decantation.

The crude halosulfate, after separation from the excess halsulfonic acid as described may be further purified by distillation or other well known techniques In the case of the reaction of fluosulfonic acid with an iodide, hydrogen fluoride which is liberated in the processing of the reaction mixture, e.g. during hydrolysis, is sometimes not entirely removed when the reaction mixture is poured over crushed ice or into water held at 0° C. In some cases it may be desirable to follow the water wash with a rapid wash with dilute $NaHCO_3$ to remove residual hydrogen fluoride, while taking care to avoid hydrolysis of the fluorosulfate.

The following examples are intended to be illustrative of the invention:

*Example 1.—Thermal reaction of 1-iodoperfluoropropane $(C_3F_7I)$ with chlorosulfonic acid*

50 grams (0.429 mole) of chlorosulfonic acid and 11.8 grams (0.0399 mole) of 1-iodoperfluoropropane are sealed under a dry, high purity nitrogen atmosphere in a 70 cubic centimeter heavy wall Pyrex ampule. The tube is shaken and heated at a temperature of 130° C. for 65 hours. The tube contents are a mixture of dark liquid and orange crystals of iodine trichloride $(ICl_3)$. After cooling in solid carbon dioxide, the ampule is opened and warmed to room temperature. The volatiles evolved during warming are passed through aqueous neutral potassium permanganate solution to remove sulfur dioxide, dried over anhydrous calcium sulfate, and finally condensed in a refrigerated trap, where there is collected 0.9 gram (0.0044 mole) of n-$C_3F_7Cl$, which is identified by its infra-red spectrum. The conversion to, and yield of n-$C_3F_7Cl$, based on the starting iodide is 11%.

The liquid portion of the reaction products remaining in the tube is distilled in a small Vigreux distillation unit from which there is obtained 10.7 grams of crude n-perfluoropropylchlorosulfate $(C_3F_7OSO_2Cl)$ having a boiling point of 66 to 70° C., shown by infra-red spectra to contain minor amounts of $SO_2Cl_2$. The yield of and conversion to, $C_3F_7OSO_2Cl$ based on the starting iodide is 89%.

A fraction of the crude material is washed with water, redistilled to produce a fraction having a boiling point of 80° C., and a refractive index of $n_D^{24}$ 1.3124. This fraction was analyzed with the following results:

Calculated for: $C_3F_7OSO_2Cl$: C, 12.7; F, 46.7; S, 11.3; Cl, 12.5. Found: C, 12.6; F, 46.6; S, 11.4; Cl, 12.5.

The ultra violet spectrum of this fluorocarbon chlorosulfate $C_3F_7OSO_2Cl$, shows a strong absorption maximum at 203 m$\mu$ in the vapor phase and at 218 m$\mu$ in the iso-octane solution; both the vapor and liquid spectra exhibit slight general absorption at 260–290 m$\mu$ with a maximum at 275 m$\mu$. These data clearly distinguish the chlorosulfate from the sulfonylchloride $$CF_3CF_2CF_2-\overset{O}{\underset{O}{\overset{\|}{S}}}-Cl$$

which has absorption maxima at 210, 220, 230 and 240 m$\mu$.

The infra-red spectrum of $C_3F_7OSO_2Cl$ produced by the above reaction has an absorption band at 682$\mu$ (vapor) and 6.89$\mu$ (liquid) which is undoubtedly associated with the asymmetrical stretching vibration of the "sulfone" (—$SO_2$—) group.

This eliminates the chlorosulfite, $$CF_3CF_2CF_2-O\overset{O}{\overset{\|}{S}}Cl$$

with a "sulfoxide" (—SO—) group which should not have a band at 6.8–6.9$\mu$.

The formation of the chlorosulfate by the above reaction rather than the sulfonyl chloride, the sulfonic acid or the chlorosulfite is further confirmed by the reactions of this chlorosulfate with water, ammonia, amines, alcohols and mercaptans as described in copending application Serial No. 735,702, filed May 16, 1958.

*Example 2.—Reaction of the perfluoro telomer iodide $C_3F_7[CF_2CF(CF_3)]_4(CF_2)_{12\ av}I$ [1] with chlorosulfonic acid*

The above telomer iodide used as a starting material is prepared as follows. A Monel metal autoclave, of approximately 140 cc. volume, containing 40 grams (0.0446 mole) of $C_3F_7[CF_2CF(CF_3)]_4I$ is sealed, evacuated, and cooled to —195° C. Forty grams (0.40 mole) of tetrafluoroethylene ($CF_2=CF_2$) is admitted to the autoclave by gaseous transfer in vacuo. The reaction mixture is heated while shaking for eighteen hours at a temperature of 190° C. during which the pressure drops from 1400 p.s.i. to below 50 p.s.i. From this reaction there is recovered 1 gram of olefin and 8 grams of $$C_3F_7[CF_2CF(CF_3)]_4I.$$

A total of 70 grams (75% conversion) of a white, soft solid $C_3F_7[CF_2CF(CF_3)]_4(CF_2CF_2)_nI$ where the value of $n$ averages 12 per molecule, and containing no substantial amount of material in which the value of $n$ is less than 9 or greater than 25, and having a melting range of 44° to 150° C. (clear melt) is finally collected from autoclave. Elemental analysis shows the following:

Calculated for: $C_{39}F_{79}I$: C, 22.3; F, 71.6. Found: C, 22.6; F, 70.2.

Twenty-five grams (0.215 mole) of chlorosulfonic acid and 14.5 grams (0.0069 mole) of the telomer iodide prepared as above are sealed under a dry nitrogen atmosphere in a 70 cc. heavy wall Pyrex ampule and heated at 150° C. for 17 hours with shaking. The tube is cooled in solid carbon dioxide (crystals of $ICl_3$ precipitate) and opened. The acid liquid is decanted and the soft, white solid remaining is dried under nitrogen. 12 grams (84% conversion) of the chlorosulfate, $$C_3F_7[CF_2CF(CF_3)]_4(CF_2CF_2)_{12\ av}OSO_2Cl,$$

is obtained, and a 7.5 gram aliquot is distilled in a small Vigreux distillation unit at about 0.1 mm. Hg pressure to effect the separation of the following fractions:

(a) A fraction boiling between 120–142° C. (principally between 135–140° C.) representing 28% by weight of the aliquot. This is a white opalescent viscous oil all having the formula $$C_3F_7[CF_2CF(CF_3)]_4(CF_2CF_2)_{9\ av}OSO_2Cl,$$

having the following analysis:

Calculated for: $C_{33}F_{67}O_3SCl$: C, 22.2; F, 71.3; S, 1.8; Cl, 2.0. Found: C, 22.5; F, 70.6; S, 1.8; Cl, 2.0.

(b) A second fraction boiling between 180–190° C. representing 28% by weight of the aliquot. This is a white grease having the formula $$C_3F_7[CF_2CF(CF_3)]_4(CF_2CF_2)_{11\ av}OSO_2Cl,$$

having the following analysis:

Calculated for: $C_{37}F_{75}O_3SCl$: C, 22.4; F, 71.8; S, 1.6; Cl, 1.8. Found: C, 22.4; F, 72.4; S, 1.6; Cl, 1.8.

---

[1] Av denotes "average" indicating a mixture of telomers in which the average number of tetrafluoroethylene ($CF_2CF_2$) units is 12.

(c) A third fraction boiling between 190° C. to 200° C. representing 21% by weight of the aliquot. This is a white wax having the formula $C_3F_7[CF_2CF(CF_3)]_4(CF_2CF_2)_{13\,av}OSO_2Cl$, having the following analysis:

Calculated for: $C_{41}F_{83}O_3SCl$: C, 22.5; F, 72.2; S, 1.5; Cl, 1.6. Found: C, 22.5; F, 71.9; S, 1.4; Cl, 1.6.

(d) A residue consisting of a white friable solid representing 23% by weight of the aliquot, having a melting point of from 245° to 281° C. No decomposition of this solid is noted during the distillation despite a still pot temperature of greater than 400° C. This material, of the following structure:

$C_3F_7[CF_2CF(CF_3)]_4(CF_2CF_2)_{25\,av}OSO_2Cl$, analyzes as follows:

Calculated for: $C_{65}F_{131}O_3SCl$: C, 23.1; F, 73.5; S, 0.95; Cl, 1.05. Found: C, 23.5; F, 73.5; S, 0.90; Cl, 1.07.

The infra-red spectra of the above series of compounds $C_3F_7[CF_2CF(CF_3)]_4(CF_2CF_2)_nOSO_2Cl$ have a band at 6.85μ (shoulder at 6.94μ) which is assigned to the —$OSO_2$— group.

*Example 3.—Reaction of*
$CF_2ClCF(CF_3)[CF_2CF(CF_3)]_{2\,av}(CF_2CF_2)_{4\,av}I$
*with chlorosulfonic acid*

The above telomer iodide is prepared as follows:

To a 300 cc. Monel autoclave containing 78 grams (0.249 mole) of $CF_2ClCFICF_3$, while evacuated and cooled in liquid nitrogen, there is admitted by gaseous transfer in vacuo 75 grams (0.50 mole) of $CF_2=CFCF_3$ and 49.5 grams (0.495 mole) of $CF_2=CF_2$ (the molar ratio of $CF_2=CF_2:CF_2=CFCF_3:CF_2ClCFICF_3$ equals 2:2:1). The autoclave is sealed and heated at 190° to 220° C. for about five hours while shaking. The pressure drops from 1100 to 900 lbs./in.² gage during this time, most of the drop occurring during the first three hours. There is recovered from the reaction 60 grams of unreacted olefins (mostly perfluoropropene). The remaining liquid products are fractionally distilled in a small Vigreux still. In addition to unreacted $CF_2ClCFICF_3$ there is collected the following liquid co-telomer fractions:

(a) 14 grams (32 wt. percent) of a liquid having a boiling point of 36° to 52° C. at about 0.1 mm. Hg.

(b) 6.5 grams (15 wt. percent) of a liquid having a boiling point of 52° to 62° C. at about 1.1 mm. Hg.

(c) 7 grams (16 wt. percent) of a liquid having a boiling point of from 62° to 82° C. at about 0.1 mm. Hg.

(d) 3 grams (7 wt. percent) of a liquid having a boiling point of from 82° to 89° C. at about 0.1 mm. Hg.

A residue of 14 grams mainly solids, remains undistilled.

Fraction (c) above having the approximate formula $CF_2ClCF(CF_3)[CF_2CF(CF_3)]_{2\,av}(CF_2CF_2)_{4\,av}I$ is reacted with an excess of chlorosulfonic acid at a temperature of 150° C. for about 20 hours with shaking. After separation from the excess chlorosulfonic acid, and working up as in Example 1, the chlorosulfate $CF_2ClCF(CF_3)[CF_2CF(CF_3)]_{2\,av}(CF_2CF_2)_{4\,av}OSO_2Cl$, is obtained.

*Example 4.—The reaction of $C_2F_5(CF_2CF_2)_3I$ with chlorosulfonic acid*

The iodide $C_2F_5(CF_2CF_2)_3I$ is prepared by the reaction of $C_2F_5I$ with $CF_2=CF_2$ at room temperature in the presence of ultra-violet light, using the procedures described by Haszeldine, Journal of the Chemical Society, 3761 (1953).

This iodide is reacted with an excess of chlorosulfonic acid at a temperature of 145° C. in a sealed tube for about 15 hours with shaking. Excess chlorosulfonic acid is removed and the crude product is worked up using procedures similar to those in Example 1 to obtain the chlorosulfate $C_2F_5(CF_2CF_2)_3OSO_2Cl$.

*Example 5.—Reaction of $I(CF_2CF_2)_3I$ with chlorosulfonic acid*

The diiodide $I(CF_2CF_2)_3I$ is prepared by reaction of $ICF_2CF_2I$ with $CF_2=CF_2$ at room temperature in the presence of ultraviolet light, using the general procedures described by Haszeldine, Journal of the Chemical Society, 3761 (1953).

The diiodide $I(CF_2CF_2)_3I$ is reacted with an excess of chlorosulfonic acid in a sealed tube at a temperature of 140° C. for about 20 hours with shaking. After removal of the excess chlorosulfonic acid, the product is worked up as in Example 1 to obtain the dichlorosulfate $ClO_2SO(CF_2CF_2)_3OSO_2Cl$.

*Example 6.—Reaction of $I(CF_2)_5I$ with chlorosulfonic acid*

The diiodide $I(CF_2)_5I$ is prepared by the reaction of $CF_2I_2$ (prepared by the reaction of $CI_4$ with $IF_5$) with $CF_2=CF_2$ at room temperature in the presence of ultraviolet light.

The diiodide $I(CF_2)_5I$ is reacted with an excess of chlorosulfonic acid at a temperature of 140° C. in a sealed tube for 20 hours with shaking. After removal of excess chlorosulfonic acid, the product is worked up as in Example 1 to obtain the dichlorosulfate $ClO_2SO(CF_2)_5OSO_2Cl$

*Example 7.—Reaction of $ICF_2(CH_2CF_2)_4I$ with chlorosulfonic acid*

The diiodide $ICF_2(CH_2CF_2)_4I$ is prepared by reacting $CF_2I_2$ (prepared from the reaction of $CI_4$ with $IF_5$) with $CH_2=CF_2$ at a temperature of about 200° C. following the procedures described in U.S. Patent 2,975,220.

The diiodide $ICF_2(CH_2CF_2)_4I$ is reacted with an excess of chlorosulfonic acid at 0 to 5° C. for 4 hours at atmospheric pressure. The reaction product is poured over chipped ice. The lower organic layer is removed, and after drying, there is obtained the dichlorosulfate $ClO_2SOCF_2(CH_2CF_2)_4OSO_2Cl$.

*Example 8.—Reaction of $C_2F_5CF(CF_3)(CH_2CF_2)_3I$ with chlorosulfonic acid*

The above telomer iodide is prepared by reacting $C_2F_5CF(CF_3)I$ with $CH_2=CF_2$ at a temperature of about 200° C. following the procedures described in detail in U.S. Patent 2,975,220 of Murray Hauptschein et al.

50 grams (0.429 mole) of chlorosulfonic acid is placed in a 250 cc. 3 necked flask equipped with an addition funnel, stirrer, thermometer, and gas inlet tube by means of which the apparatus is purged and maintained under a dry nitrogen atmosphere. 26 grams (0.0483 mole) of $C_2F_5CF(CF_3)(CH_2CF_2)_3I$ prepared as described above is added to the chlorosulfonic acid dropwise with stirring. During the addition, requiring 20 minutes, the temperature of the vigorous exothermic reaction is maintained at 4 to 5° C. by the use of an ice water bath. Solid crystalline iodine forms in the reaction mixture. The reaction mixture is stirred at 0° to 4° C. for 1.5 hours and cautiously hydrolyzed by drop by drop addition of 40 ml. of ice water. The lower organic layer is removed and combined with several 10 ml. portions of 1,1,2-trichlorotrifluoroethane used to extract the remaining aqueous layer. After drying and removal of the solvent by distillation, the residue is distilled in a small Vigreux distillation unit. From this fractionation there is recovered 4.5 grams (0.0084 mole) of the reactant iodide, and 18 grams (0.034 mole) of crude chlorosulfate $C_2F_5CF(CF_3)(CH_2CF_2)_3OSO_2Cl$ having a boiling point of 74 to 86° C. at about 0.1 mm. Hg. The conversion of the starting iodide to the chlorosulfate is 79%, and the yield of chlorosulfate based on converted iodide is 90%.

A fraction having a boiling point mainly at 80° C. at about 0.1 mm. Hg, and having a refractive index $n_D^{27}$ 1.352 is analyzed as follows:

Calculated for: $C_{10}H_6ClF_{15}O_3S$: C, 22.8; H, 1.1; Cl, 6.7; S, 6.1. Found: C, 23.2; H, 0.9; Cl, 6.3; S, 6.0.

The infra-red spectra of this series of compounds $C_2F_5CF(CF_3)(CH_2CF_2)_nOSO_2Cl$ have a band at 6.94μ which is assigned to the —$OSO_2$— group.

*Example 9.—Reaction of $CF_2ClCF(CF_3)(CH_2CF_2)_{4.5\ av}I$ with chlorosulfonic acid*

18 grams (0.0299 mole) of $$CF_2ClCF(CF_3)(CH_2CF_2)_{4.5\ av}I$$

is placed in a three-necked flask, cooled in an ice bath, and equipped with a stirrer, thermometer, addition funnel and gas inlet tube for purging and maintaining a nitrogen atmosphere. This iodide was prepared by reacting $CF_2ClCFICF_3$ with $CH_2=CF_2$ at approximately 185° C. under about 4000 lbs./in.² gage pressure. Its preparation is described in more detail in U.S. Patent 2,975,220. To this iodide there is added very slowly 25 grams (0.215 mole) of chlorosulfonic acid. Crystalline iodine is liberated and sulfur dioxide is evolved during the addition as the chlorosulfate is formed. The temperature of the reaction mixture during the addition is 0° C., and stirring is continued for 2 hours.

Without working up the crude chlorosulate, $$CF_2ClCF(CF_3)(CH_2CF_2)_{4.5\ av}OSO_2Cl$$

it is hydrolyzed by addition of water.

The lower organic layer is taken up in 1,1,2-trichlorotrifluoroethane, washed with dilute $Na_2S_2O_3$ solution, dried with anhydrous calcium sulfate, and distilled to remove solvent. From the residue there is separated by distillation 12 grams (0.0256 mole) of a liquid having a boiling point ranging from 64° C. to greater than 126° C. at about 0.1 mm. Hg, representing about 85% yield and conversion based upon the starting iodide. This is shown by infra-red spectra to consist entirely of a mixture of fluorocarbon acid $$CF_2ClCF(CF_3)(CH_2CF_2)_{3.5\ av}CH_2COOH$$

and the acid fluoride

The acyl fluoride carbonyl absorption at 5.39μ decreases progressively with increasing boiling point of the fractions.

The fluorocarbon acid fluoride

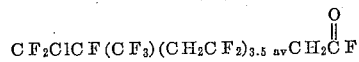

was characterized by formation of the amide

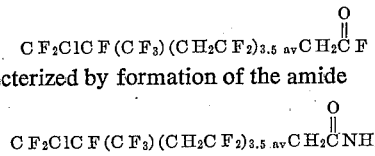

Anhydrous ammonia is passed through a solution of 7 grams (0.149 mole) of the acid fluoride in 50 ml. of anhydrous ether for 15 minutes. The solution is filtered, and the filtrate is distilled. After removal of the solvent there is obtained as the sole product 5.3 grams of the amide having a boiling point of from 156° to 162° C. at about 0.1 mm. Hg, and having a melting point of 49° to 50° C. after one recrystallization from 1,1,2-trichlorotrifluoroethane. The conversion based on starting acid fluoride is 76%. The amide is analyzed as follows:

Calculated for: $C_{12}H_{11}OF_{13}ClN$: C, 30.8; H, 2.4; N, 3.0. Found: C, 31.3; H, 2.7; N, 3.1.

*Example 10.—Reaction of 2-iodoperfluorohexane with chlorosulfonic acid*

20 grams (0.17 mole) of chlorosulfonic acid and 5 grams (0.0112 mole) of the secondary perfluoroiodide $CF_3CF_2CF_2CF_2CFICF_3$ are sealed in a heavy walled Pyrex ampule and heated at 148° C. for 112 hours. A mass of orange crystals of iodine trichloride form at the bottom of the tube. The tube is then cooled and opened and the top layer, a clear yellow oil, is decanted. On warming to room temperature, sulfur dioxide gas is evolved. A small amount of additional oil is collected on hydrolysis of the iodine trichloride-acid layer, combined with the main fraction, washed with dilute potassium carbonate solution, dried with anhydrous calcium sulfate, and distilled to give entirely 2-chloroperfluorohexane, $CF_3CF_2CF_2CF_2CFClCF_3$, having a boiling point of 83° to 84° C., and a refractive index $n_D^{26}$ 1.2826. No chlorosulfate appears to be formed in this reaction.

However, when the reaction is carried out at a lower temperature, the chlorosulfate forms in small yield together with a small yield of the corresponding chloride. Thus, 17.8 grams (0.0399 mole) of 2-iodoperfluorohexane is reacted with 50 grams (0.429 mole) of chlorosulfonic acid in a sealed tube at 75° C. for 4.25 hours and at 95° C. for 2 hours respectively. Mainly unreacted iodide is recovered from these reactions, together with small amounts of 2-chloroperfluorohexane and perfluoro-2-hexylchlorosulfate,

which are detected by infra-red spectroscopic analyses. The formation of the perfluoro-2-hexylchlorosulfate is further confirmed by its hydrolysis to the perfluorocarboxylic acid $C_4F_9COOH$.

*Example 11.—Reaction of 1,2-dichloro-1,2,2-trifluoroiodoethane with chlorosulfonic acid*

To 93 grams (0.8 mole) of chlorosulfonic acid heated to 50° C. is added during ten minutes while stirring vigorously 23 grams (0.0825 mole) of $CF_2ClCFClI$. (This latter compound may be prepared by the reaction of iodine chloride (ICl) with $CF_2=CFCl$ at 30° C.) The reaction mixture is heated to 60° C. and stirred for 2 additional hours. After cooling, the reaction mixture is rapidly hydrolyzed by pouring over chipped ice. The lower water insoluble layer is dried with anhydrous calcium sulfate and distilled. There is collected after recovery of unreacted iodide, 12 grams of the chlorosulfate $CF_2ClCFClOSO_2Cl$. This material was redistilled at 76° C. at 100 mm. Hg. The product has a refractive index of $n_D^{30}$ 1.392, and its infra-red spectrum shows the characteristic chlorosulfate band at 6.9μ (liquid) and 6.84 (vapor) and has the following analysis:

Calculated for: $C_2F_3Cl_3O_3S$: C, 9.0; S, 12.0. Found: C, 9.4; S, 12.0.

*Example 12.—Reaction of 1,1-dichloro-1,2,2-trifluoro-2-iodoethane with chlorosulfonic acid*

The compound $CFCl_2CF_2I$ and its preparation is described in U.S. Patent 3,002,030 of Murray Hauptschein and Milton Braid.

Thirty grams (0.108 mole) of the iodide, 1,1-dichloro-1,2,2-trifluoro-2-iodoethane is added drop by drop during one-half hour to 70 grams (0.601 mole) of chlorosulfonic acid while stirring. During the addition, the reaction temperature is gradually raised until the liberation of iodine and the evolution of $SO_2$ is observed at 100° C. after the addition of about 8 grams of the iodide. The addition is completed, and the reaction mixture is then stirred for 2 hours longer at 100° C. After cooling, the contents of the flask are poured onto chipped ice and the lower layer is separated, washed once with cold water, dried with a mixture of calcium and magnesium sulfates, and distilled in a small still packed with glass helices. There is collected, after a small forerun containing less than one gram of unreacted iodide and 1,1,2-trichlorotrifluoroethane, 15 grams of the chlorosulfate $$CFCl_2CF_2OSO_2Cl$$

the middle cut boiling at 76° C. at about 100 mm. Hg.

The compound is a colorless liquid having a refractive index $n_D^{25}$ 1.3943, which is analyzed as follows:

Calculated for: $C_2Cl_3F_3O_3S$: C, 8.98; S, 11.99. Found: C, 9.25; S, 12.24.

The infra-red spectrum of this compound has a strong band at 6.89μ (liquid) and 6.82μ (vapor).

*Example 13.—Reaction of 1,2-dichloro-1-iodo-2,2-difluoroethane with chlorosulfonic acid*

To 25 grams (0.214 mole) of chlorosulfonic acid heated at 60° to 65° C. there is added drop by drop during fifteen minutes 10 grams (0.0383 mole) of $CF_2ClCHClI$ while stirring. (The latter compound is prepared by reaction of iodine chloride (ICl) with the olefin $CF_2=CHCl$ at a temperature of about 40° C. in an autoclave at autogenous pressure.) The reaction mixture is stirred for 1 hour at 80 to 85° C. and, finally, at 90° C. for 2.5 hours. After rapid hydrolysis of the reaction mixture by pouring onto chipped ice, the lower liquid layer is separated and dried with anhydrous calcium sulfate. Upon distillation of the latter liquid, 5 grams of the chlorosulfate $$CF_2ClCHClOSO_2Cl$$

is collected, the middle cut boiling at 78° to 79° C. at 5 mm. Hg, and having a refractive index $n_D^{25}$ 1.418. The infra-red spectrum of this compound shows the characteristic chlorosulfate band at 6.9μ and has the following analysis:

Calculated for: $C_2HO_3Cl_3F_2S$: C, 9.6; H, 0.40; Cl, 42.6; S. 12.9. Found: C, 10.6; H, 0.57; Cl, 42.3; S, 12.2.

*Example 14.—Reaction of 1,2,2,2-tetrafluoro-1-iodoethane with chlorosulfonic acid*

Following the procedures of Example 13, the iodide $CF_3CHFI$ (prepared by the addition of iodine monofluoride to the olefin $CF_2=CHF$ as described in United States Patent No. 3,006,973) is reacted with a molar excess of chlorosulfonic acid at 130° C. for 5 hours according to the procedure described in Example 13. There is obtained a good yield of the chlorosulfate $$CF_3CHFOSO_2Cl$$

*Example 15.—Reaction of $CF_2ClCHCl[CF_2CHCl]_{4av}I$ with chlorosulfonic acid*

The above telomer iodide mixture (prepared according to the procedure described in United States Patent No. 3,051,764) is reacted with a 10 fold molar excess of chlorosulfonic acid at a temperature of 75° C. for 6 hours. There is obtained from this reaction a good yield of a mixture of chlorosulfates of the formula $$CF_2ClCHCl[CF_2CHCl]_{4av}OSO_2Cl$$

*Example 16.—Reaction of 1-iodoperfluoropropane with fluosulfonic acid*

15 grams (0.0507 mole) of $CF_3CF_2CF_2I$ and 30 grams (0.3 mole) of fluosulfonic acid are sealed in vacuo in a 70 cc. heavy-walled Pyrex ampule. The tube is shaken and heated at a temperature of 150° C. for 5 hours. The ampule is cooled in liquid nitrogen and opened. Approximately 0.5 gram of volatile products are collected on warming to room temperature which are found by vapor-liquid partition chromatographic and infra-red spectroscopic analyses to contain $SO_2$, $SiF_4$, and $C_3F_8$. In addition, trace amounts of other fluorocarbon materials not fully characterized are present.

The remaining liquid reaction mixture is poured cautiously onto chipped ice. The lower organic layer is separated, washed once with cold 10% aqueous sodium bicarbonate solution, washed again with water, and dried with anhydrous calcium and magnesium sulfate. By vapor-liquid partition chromatographic analysis, in a Perkin Elmer Vapor Fractometer Model 154, the reaction mixture (10.5 grams) is shown to consist almost entirely of equimolar amounts of unreacted n-$C_3F_7I$ (5.5 grams) and n-perfluoropropyl fluorosulfate, $CF_3CF_2CF_2OSO_2F$ (5 grams). The yield of this fluosulfate, based on reacted iodide is greater than 95% (including $$CF_3CF_2COOH$$

from hydrolysis of the fluosulfate during isolation).

An analytical sample of n-$C_3F_7OSO_2F$ is freed from contaminant n-$C_3F_7I$ chromatographically using a Perkin Elmer "B" column at 30° C. under 30 pounds per square inch gage pressure of helium. The elution times for the iodide and the fluorosulfate are 6.2 minutes and one minute respectively. The pure n-perfluoropropyl fluorosulfate is a colorless liquid having a boiling point of 46° C., a refractive index $n_D^{25}$<1.290. It has a strong band in the infra-red spectrum at 6.65μ (vapor) related to the asymmetrical stretching vibration of the "sulfone" (—$SO_2$—) function of the fluorosulfate group which is 0.17μ farther to the visible end of the spectrum than that for the corresponding chlorosulfate. This compound is analyzed as follows:

Calculated for: $C_3F_8O_3S$: C, 13.4; F, 56.7. Found: C, 13.7; F, 56.7.

*Example 17.—Reaction of 1,2-dichloro-1,2,2-trifluoro-1-iodoethane with fluosulfonic acid*

To 45 grams (0.449 mole) of fluosulfonic acid stirred at 70° C. there is added drop by drop during ½ hour 40 grams (0.143) of $CF_2ClCFClI$. Iodine and $SO_2$ are liberated during the addition period and traces of 1,2-dichlorotetrafluoroethane, $CF_2ClCF_2Cl$, are detected in the evolved volatiles spectrascopically. The reaction mixture is stirred for 2 hours at 70° C. and after cooling, is hydrolyzed by pouring cautiously onto chipped ice. The lower organic layer is separated, washed once with cold 10% aqueous sodium bicarbonate solution, and again with cold water.

The mixture of crude reaction products (38 grams) is dried with anhydrous calcium sulfate and magnesium sulfate. By vapor-liquid partition chromatographic analysis this liquid fraction is shown to consist of 8 grams (90% yield based on reacted iodide) of 1,2-dichloro-1,2,2,-trifluoroethylfluorosulfate, $CF_2ClCFClOSO_2F$, and 30 grams of unreacted iodide.

An analytical sample of $CF_2ClCFClOSO_2F$ is separated chromatographically from the $CF_2ClCFClI$ contaminant using a Perkin Elmer "B" column at 75° C. under 30 pound per square inch gage pressure of helium. The elution times of $CF_2ClCFClOSO_2F$ and $$CF_2ClCFClI$$

were 4.9 and 27 minutes respectively.

Pure $CF_2ClCFClOSO_2F$ is a colorless liquid having a boiling point of 89° C., a refractive index $n_D^{24}$ 1.3468. The infra-red spectrum of this fluorosulfate has a strong band at 6.71μ (vapor) characteristic of the —$OSO_2F$ group. The compound is analyzed as follows:

Calculated for $C_2Cl_2F_4O_3S$: C, 9.6; Cl, 28.3; F, 30.3; S, 12.8. Found: C, 9.8; Cl, 28.2; F, 30.3; S, 12.6.

*Example 18.—Reaction of $C_2F_5CF(CF_3)(CH_2CF_2)_2I$ with fluosulfonic acid*

To 40 grams (0.4 mole) of fluosulfonic acid stirred at 40° C. there is added drop by drop during one-quarter-hour 10 grams (0.211 mole of $C_2F_5CF(CF_3)(CH_2CF_2)_2I$ and stirring is continued at 40° C. for one and a quarter hours longer. Crystalline iodine and $SO_2$ are formed during the reaction. After cooling, the reaction mixture is hydrolyzed by cautiously pouring onto chipped ice. The lower organic layer is separated, washed with 10% aqueous sodium bicarbonate solution and again with water. The crude liquid reaction products (9.5 grams) are dried with anhydrous calcium and magnesium sulfate and distilled in a small Vigreux distillation unit. There is obtained 7 grams (75% yield based on reacted iodide) of the fluorosulfate $C_2F_5CF(CF_3)(CH_2CF_2)_2OSO_2F$. The middle cut of this product has a boiling point of 114° C. at 100 mm. Hg.

The infra-red spectrum of this fluorosulfate has a strong absorption band at 6.75μ (liquid) characteristic of the —OSO₂F group. This compound is analyzed as follows:

Calculated for: C₈H₄F₁₄O₃S: C, 21.5; H, 0.90. Found: C, 21.1; H, 0.90.

*Example 19.—Reaction of C₃F₇[CF₂CF(CF₃)]₂I with fluosulfonic acid*

35 grams (0.35 mole) of fluosulfonic acid and 18.5 grams (0.031 mole) of C₃F₇[CF₂CF(CF₃)]₂I are sealed in a 75 cc. steel autoclave and heated for about 16 hours at 230° to 235° C. The vessel is cooled and opened and the liquid contents are hydrolyzed by cautiously pouring onto chipped ice. The lower layer is separated, dried and distilled in a small Vigreux distillation unit.

There is collected 8 grams of a liquid having a boiling point of from 85° C. to above 160° C., mainly (6 grams) boiling from 85° to 89° C. This product consists of the fluorosulfate C₃F₇[CF₂CF(CF₃)]₂OSO₂F (as shown by the 6.7μ peak in the infra-red spectrum) and the fluoride C₃F₇[CF₂CF(CF₃)]₂F.

*Example 20.—Reaction of 1-chloro-1,3,3,3-tetrafluoro-1-iodoethane with chlorosulfonic acid*

52.5 grams (0.2 mole) of the iodide CF₃CFClI, prepared as described in U.S. Patent 3,006,973 is added to 116.5 grams (1 mole) of chlorosulfonic acid heated at 75° C. during a one-half hour period. The reaction mixture is stirred for two hours longer at 75° C. After cooling, the reaction mixture is hydrolyzed by pouring onto crushed ice. The lower layer is rapidly washed with water and dried with anhydrous calcium sulfate. Upon distillation there is collected the chlorosulfate $$CF_3CFClOSO_2Cl$$

having a boiling point of about 90° C.

*Example 21.—Reaction of 1,1-dichloro-2,2,2-trifluoro-1-iodoethane with chlorosulfonic acid*

Twenty-eight grams (1.1 mole) of the iodide $$CF_3CCl_2I$$

prepared as described in U.S. Patent 3,006,973 is added to 58.2 grams (0.5 mole) of chlorosulfonic acid at room temperature during a period of 20 minutes. The reaction mixture is stirred for 1 day at room temperature, and is then hydrolyzed by pouring onto crushed ice. The lower layer is rapidly washed with water and dried with anhydrous calcium sulfate. Upon distillation there is collected the chlorosulfate CF₃CCl₂OSO₂Cl having a boiling point of about 77° C. at 100 mm. Hg.

*Example 22.—Reaction of*

$$\underset{CF_3\overset{|}{C}F[CF_2CF_2]_4I}{}$$

*with chlorosulfonic acid*

Into a two liter, three necked flask equipped with a sealed stirrer, thermometer, and reflux column there is charged 696 grams (1.0 mole) of $$CF_3\overset{CF_3}{\underset{|}{C}}F[CF_2CF_2]_4I$$

and 1165 grams (10 moles) of chlorosulfonic acid. The mixture is heated at 130–145° C. while stirring for 6 hours. The reflux condenser is adjusted to permit iodine monochloride, iodine trichloride, SO₂ and HCl evolved during the reaction to distill over to suitable collectors while refluxing organic material back into the reaction vessel. The reaction mixture is allowed to cool, is then poured into a separatory funnel and allowed to separate into two layers. The lower organic layer is drawn off and cleanly separated from the upper spent chlorosulfonic acid layer. From this reaction there is obtained a 78.9% yield of the chlorosulfate $$CF_3\overset{CF_3}{\underset{|}{C}}F[CF_2CF_2]_4OSO_2Cl$$

a colorless liquid.

*Example 23.—Reaction of*

$$\underset{CF_3\overset{|}{C}F[CF_2CF_2]_4I}{\overset{CF_2Cl}{}}$$

*with chlorosulfonic acid*

Following the procedures of the previous example, the iodide $$\underset{CF_3\overset{|}{C}F[CF_2CF_2]_4I}{\overset{CF_2Cl}{}}$$

is reacted with a 10 fold molar excess of chlorosulfonic acid at a temperature of 135–150° C. for 6¾ hours. The product separates into two layers and the lower chlorosulfate layer is separated from the upper layer of excess chlorosulfonic acid to provide an 80.4% yield of the chlorosulfate $$\underset{CF_3\overset{|}{C}F[CF_2CF_2]_4OSO_2Cl}{\overset{CF_2Cl}{}}$$

a colorless liquid

*Example 24.—Reaction of*

$$\underset{CF_2Cl\overset{|}{C}F[CF_2CF_2]_3I}{\overset{CF_3}{}}$$

*with fluosulfonic acid*

Into a 300 milliliter stainless steel autoclave there is charged 91.8 grams (0.15 mole) of $$\underset{CF_2Cl\overset{|}{C}F[CF_2CF_2]_3I}{\overset{CF_3}{}}$$

and 150 grams (1.5 moles) of fluosulfonic acid. The starting iodide is prepared by the reaction of $$\underset{CF_2Cl\overset{|}{C}FI}{\overset{CF_3}{}}$$

with tetrafluoroethylene according to the procedure described in co-pending application Serial No. 82,701, filed January 16, 1961, of Murray Hauptschein and Milton Braid. The autoclave and contents are heated at 195° C. for 16½ hours while shaking. After cooling, the autoclave is opened, the contents poured out, and permitted to settle into two layers. The lower organic layer is separated from the spent fluosulfonic acid in a separatory funnel, giving 78 grams (83% yield) of the fluosulfate $$\underset{CF_2Cl\overset{|}{C}F[CF_2CF_2]_3OSO_2F}{\overset{CF_3}{}}$$

a colorless liquid having a boiling point of 94°–95° C. at 20 mm. Hg. The infrared spectrum of this product shows the characteristic SO₂ peak at 6.69μ.

We claim:

1. A method for preparing halogenated halosulfates which comprises reacting at a temperature from about −20° C. to +300° C. an acid selected from the class consisting of chlorosulfonic acid and fluosulfonic acid with a haloalkyl iodide selected from the class consisting of those having the formulae $$RCX_2I, R'\overset{R''}{\underset{|}{C}}XI \text{ and } RCX_2CXHI$$

where R is selected from the class consisting of chlorine, fluorine, and haloalkyl radicals which are at least half halogenated; where R' and R" are haloalkyl radicals which are at least half halogenated; and where X is selected from the class consisting of chlorine and fluorine.

2. A method in accordance with claim 1 in which R, R' and R" are selected from the class consisting of perfluoroalkyl, radicals perfluorochloroalkyl radicals in which the ratio of fluorine to chlorine atoms is at least 1:1, perfluorohydroalkyl radicals in which the ratio of fluorine to hydrogen atoms is at least 1:1 and perfluorochlorohydroalkyl radicals in which the ratio of chlorine atoms plus fluorine atoms to hydrogen atoms is at least 1:1.

3. A method in accordance with claim 1 in which said acid is chlorosulfonic acid.

4. A method for preparing halogenated chlorosulfates which comprises reacting at a temperature of from −5 to +250° C. chlorosulfonic acid with a haloalkyl iodide selected from the class consisting of those having the formulae $RCX_2I$,

and $RCX_2CXHI$ where R, R' and R'' are selected from the class consisting of perfluoroalkyl radicals, perfluorochloroalkyl radicals, in which the ratio of fluorine to chlorine atoms is at least 1:1 perfluorohydroalkyl radicals in which the ratio of fluorine to hydrogen atoms is at least 1:1 and perfluorochlorohydroalkyl radicals in which the ratio of chlorine atoms plus fluorine atoms to hydrogen atoms is at least 1:1; and where X is selected from the class consisting of fluorine and chlorine.

5. A method for preparing halogenated halosulfates which comprises reacting at a temperature from about −20° C. to +300° C. an acid selected from the class consisting of chlorosulfonic acid and fluosulfonic acid with a haloalkyl iodide of the formula $RCX_2I$, where R is selected from the class consisting of chlorine, fluorine and haloalkyl radicals which are at least half halogenated; and where X is selected from the class consisting of chlorine and fluorine.

6. A method in accordance with claim 5 in which R is selected from the class consisting of perfluoroalkyl radicals, perfluorochloroalkyl radicals in which the ratio of fluorine to chlorine atoms is at least 1:1, perfluorohydroalkyl, radicals in which the ratio of fluorine to hydrogen atoms is at least 1:1 and perfluorochlorohydroalkyl radicals in which the ratio of chlorine atoms plus fluorine atoms to hydrogen atoms is at least 1:1.

7. A method in accordance with claim 5 in which said acid is chlorosulfonic acid.

8. A method for preparing halogenated chlorosulfates which comprises reacting chlorosulfonic acid at a temperature of from −5° C. to +250° C. with a haloalkyl iodide of the formula $RCX_2I$ where R is selected from the class consisting of perfluoroalkyl, radicals perfluorochloroalkyl radicals in which the ratio of fluorine to chlorine atoms is at least 1:1, perfluorohydroalkyl, radicals in which the ratio of fluorine to hydrogen atoms is at least 1:1 and perfluorochlorohydroalkyl radicals in which the ratio of chlorine atoms plus fluorine atoms to hydrogen atoms is at least 1:1 and where X is selected from the class consisting of chlorine and fluorine.

9. A method in accordance with claim 8 in which R is a perfluoroalkyl radical and in which X is fluorine.

References Cited by the Examiner
UNITED STATES PATENTS
2,428,755 10/1957 Linn _____ 260—456

FOREIGN PATENTS
299,064 1/1930 Great Britain.

OTHER REFERENCES
Fieser et al., "Organic Chemistry", 2nd Edition, page 152 (1950).

CHARLES B. PARKER, *Primary Examiner.*